United States Patent

Yamakoshi et al.

[11] Patent Number: 6,023,838
[45] Date of Patent: Feb. 15, 2000

[54] METHOD OF PRODUCING MOTOR CASING

[75] Inventors: Issei Yamakoshi; Yoshikazu Koike; Kunihiko Takagi, all of Suwa, Japan

[73] Assignee: Seiko Epson Corporation, Tokyo, Japan

[21] Appl. No.: 09/263,486

[22] Filed: Mar. 8, 1999

Related U.S. Application Data

[62] Division of application No. 08/913,321, filed as application No. PCT/JP97/00138, Jan. 22, 1997, Pat. No. 5,952,751.

[30] Foreign Application Priority Data

Jan. 23, 1996 [JP] Japan ................................. 8-009281
Feb. 1, 1996 [JP] Japan ................................. 8-016904

[51] Int. Cl.$^7$ ............................. H02K 15/00; H02K 5/00; H02K 1/12
[52] U.S. Cl. ........................... 29/596; 310/89; 310/258; 310/42
[58] Field of Search .................................. 310/89, 86, 87, 310/88, 258; 29/596; 174/50, 52.1, 61; 335/278; 336/90; 337/20, 398

[56] References Cited

U.S. PATENT DOCUMENTS

| | | | |
|---|---|---|---|
| 5,196,747 | 3/1993 | Kress et al. | 310/89 |
| 5,287,030 | 2/1994 | Nutter | 310/89 |
| 5,315,200 | 5/1994 | Lemieux et al. | 310/258 |
| 5,514,922 | 5/1996 | Yabushita et al. | 310/45 |
| 5,585,682 | 12/1996 | Konicek et al. | 310/89 |

Primary Examiner—Nestor Ramirez
Assistant Examiner—Dang Dinh Le
Attorney, Agent, or Firm—Kanesaka & Takeuchi

[57] ABSTRACT

A method for producing a motor casing having a first casing member and a second casing member which are separated in a direction of a rotation shaft of a motor is disclosed. The first and second casing members are coupled by coupling members, and a stator of the motor is held by the first casing members and the second casing member to be fixed within the casing. The method is characterized in that when it is assumed that a length of the stator held is L1, and a length from an engaging portion of the coupling member with the first casing member to an engaging portion of the coupling member with the second casing member is L2, a strength classification of the required coupling member is determined in advance by converting it into a ratio of L1 and L2.

2 Claims, 5 Drawing Sheets

METHOD OF PRODUCING MOTOR CASING

CROSS REFERENCES OF RELATED APPLICATION

This is a divisional application of the prior application Ser. No. 08/913,321 filed on Sep. 12, 1997 now U.S. Pat. No. 5,952,751, which was the National Stage of International Application No. PCT/JP97/00138, filed Jan. 22, 1997.

TECHNICAL FIELD

The invention relates to a motor casing comprising a first casing member and a second casing member which are separated in a direction of a rotational shaft of a motor wherein the first and second casing members are coupled by coupling members, a stator of the motor is held and fixed within the casing by the first casing member and the second casing member, and a method for producing it.

BACKGROUND ART

Vehicles such as electric scooters and electric vehicles which do not use an internal combustion engine are under development in these years. The motor used as a drive source for such vehicles is protected by being housed in a metallic casing.

Such a motor casing is proposed to have a structure as shown in FIG. 5.

A motor casing 100 in FIG. 5 mainly consists of a case 101 and a cover 102, and it is mounted on a vehicle body (not shown) via the bottom end of the case 101.

The case 101 and the cover 102 are joined into one body with a sealing member 106 between them by tightening steel bolts 104 in several points. And, a stator 105 of the motor has its outer periphery held to be fixed between the case 101 and the cover 102.

In the drawing, reference numeral 5 denotes a rotor, 9 a ring-shaped circuit board, 10 a rotor position sensor, and 11 a screw for fixing the circuit board 9.

Considering that the motor housed in the casing 100 is used outdoors, the casing is needed to have waterproofing and dustproofing functions in order to prevent rain water or dust from entering into the casing.

Therefore, the above-configured casing 100 is needed to be designed to place the sealing member 106 on a joining portion between the case 101 and the cover 102.

The sealing member 106 may be an O-ring formed of an elastic material or a liquid gasket to be applied.

When the O-ring is used, it is placed to be pressed and deformed on the entire circumference of the joining portion between the case 101 and the cover 102, thereby filling a gap between them by the O-ring. Therefore, it is necessary to form a groove, in which the O-ring is inserted, on the entire circumference of the joining portion between the case 101 and the cover 102. But, there are disadvantages that it is not easy to form the groove accurate in size and the cost becomes high. And, sealing by the O-ring might be incomplete due to its dimensional error, and sealing properties of the O-ring is lowered because the O-ring which is pressed and deformed is deteriorated due to its change with time.

And, when the liquid gasket is applied, a predetermined amount of liquid gasket is applied and hardened on the joining portion of the case 101 and the cover 102, so that the gasket fills a gap between them after assembling. Therefore, a step of applying the liquid gasket, a step of hardening the applied liquid gasket and the like are required, making the assembling troublesome. Thus, workability is poor. Beside, an excess portion of the liquid gasket may flow into the casing to adhere to the components of the motor. Therefore, it is necessary to strictly control the viscosity and applied amount of the liquid gasket.

After applying the liquid gasket, the case 101 and the cover 102 are connected by tightening the bolts 104 at several points. If the respective bolts are not tightened by an equal tightening force, it happens often that the cover 102 is slanted against the case 101 causing a gap in the liquid gasket and crippling the complete sealing. Therefore, the bolts 104 are needed to be tightened with extreme care, and the tightening work is troublesome.

In view of above, the conventional casing 100 has the joining portion exposed to the outside surface and needs a member dedicated for securing waterproof and dustproof, being disadvantageous in view of production and assembling. And, it has a disadvantage that it is disassembled easily by the user or the like.

Therefore, a primary object of the present invention is to provide a motor casing which has its waterproofness and dustproofness improved and the housed motor reliability enhanced.

Since the casing 100 described above has the flange 103 which is formed on the cover 102 is close to the top end of the cover 102, the bolts 104 are not longer than they are required. Their length is about half or less of the length of the stator 105 in the direction of a motor rotatable shaft 51.

And, since the component material of the bolts 104 is different from that of the case 101 and the cover 102, they have a different thermal expansion coefficient.

Therefore, if a temperature change is caused owing to heat generation by driving the motor, the bolts 104 may have a change in axial force due to a thermal stress between different types of materials, causing an excessive tensile force onto the bolts 104 or loosening them. In other words, a difference between the thermal expansion of the bolts 104 and that of tightening members (the bolts 104 and the case 101) and the tightened members (the stator 105 and the cover 102) increases, resulting in increasing a change rate between them. Therefore, the bolts 104 cannot keep the initial axial force.

Conventionally, bolts had a high strength (high allowable stress) to deal with the change in bolt axial force, their tightening torque was increased, and a large number of bolts were used to increase the number of bolt tightening points.

Therefore, the conventional case fixing structure had a disadvantage of involving the increase of parts cost. And, the high strength bolts had a disadvantage that their corrosion resistance is low because they could not be plated (corrosionproof plating) because of hydrogen embrittlement, and therefore the bolts had a poor corrosion resistance. Besides, since the bolt tightening torque is high, the tightening work is not easy, it takes time to assemble the casing, and workability is poor.

A second object of the invention is to provide a method for producing a motor casing in that in selecting coupling members which are affected by a temperature change, a strength classification of the coupling members required is determined from a numerical value in a predetermined range which is decided in view of the dimensions of the casing and the coupling members, so that the coupling members can be selected and assembled with ease.

SUMMARY OF THE INVENTION

The invention relates to a motor casing comprising a first casing member and a second casing member which are separated in a direction of a rotational shaft of a motor wherein the first and second casing members are coupled by coupling members, a stator of the motor is held and fixed within the casing by the first casing member and the second casing member, characterized by that the coupling portions between the first casing member and the second casing member are positioned inside and also deep into the first casing member.

And, the invention also relates to a method for producing a motor casing having a first casing member and a second casing member which are separated in a direction of a rotational shaft of a motor, the first and second casing members being coupled by coupling members, and a stator of the motor being held by the first casing member and the second casing member to be fixed within the casing, the method is characterized in that when it is assumed that a length of the stator held is L1 and a length from an engaging portion of the coupling member with the first casing member to an engaging portion of the coupling member with the second casing member is L2, a strength classification of the required coupling member is determined in advance by converting it into a ratio of L1 and L2.

BEST MODE FOR CARRYING OUT THE INVENTION

The motor casing of the invention will be described with reference to the embodiments shown in the accompanying drawings.

Figure 1:
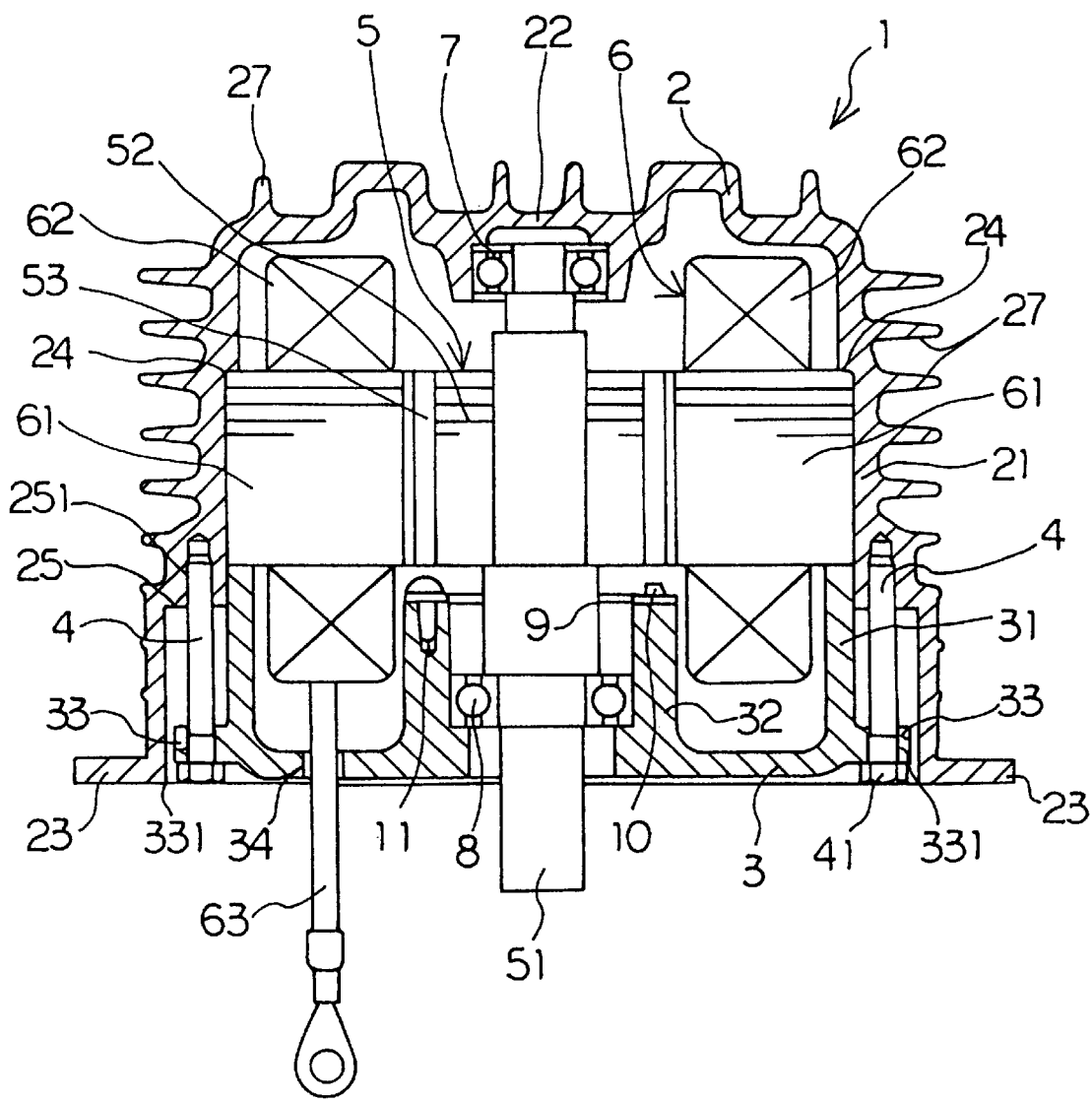
FIG. 1 is a sectional side elevation view showing an embodiment of applying the motor casing of the invention to a motor for an electric scooter.
Figure 2:
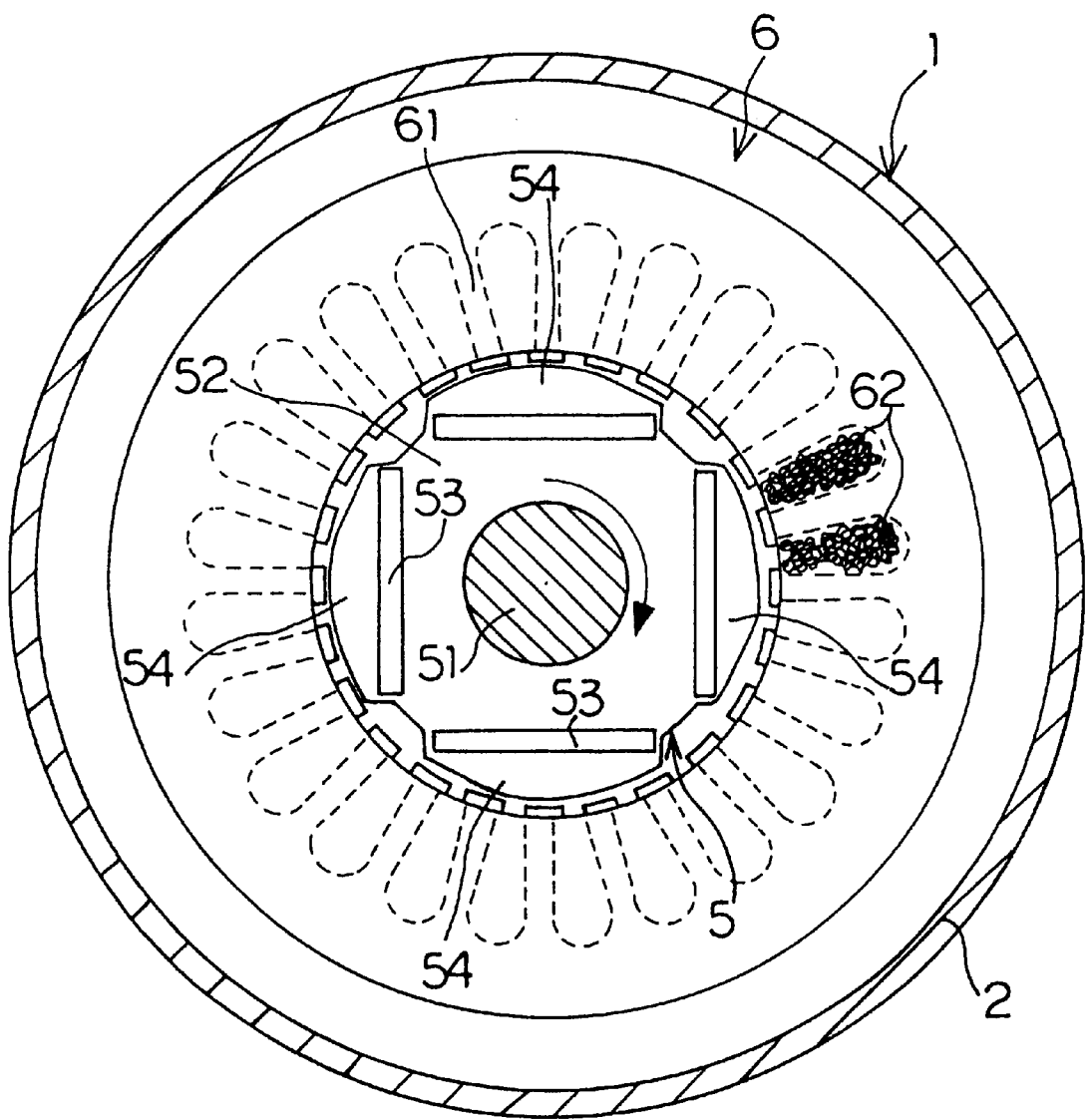
FIG. 2 is a cross sectional view of the motor casing shown in FIG. 1.

In FIG. 1 and FIG. 2, a motor casing 1 according to the invention comprises mainly a first casing member 2 and a second casing member 3. The casing 1 includes a rotor 5 and a stator (armature) 6 which configure a motor. The motor in this embodiment is a brushless DC motor.

The rotor 5 comprises a yoke 52 which is a revolving body formed by laminating silicon steel sheets of a permeable material which is stamped into a desired form, a flat permanent magnet 53 disposed (preferably embedded) to oppose a magnetic pole 54 of the yoke 52, and a rotatable shaft 51 in the form of a long rod forced into the center of the yoke 52.

The permanent magnet 53 which is good in magnetic property is, for example, a rare earth magnet basically containing a rare earth element, a transition metal and boron.

The rotatable shaft 51 is made of a material having high rigidity and strength which is formed into a long rod having a predetermined diameter and length, and has its one end rotatably supported by a bearing 7 which is forced into a bearing support 26 of the first casing member 2 and a bearing 8 which is forced into an inner cylinder 32 of the second casing member 3 as will be described afterward. And, the other end of the rotatable shaft 51 is pierced through the casing 1 (the second casing member 3) to protrude outside, so that the rotary force of the motor can be inputted into an external device. Besides, the outer peripheral surface of the rotor 5 is opposed to the inner peripheral surface of the stator 6 with a predetermined space (gap) between them.

Where the casing 1 is mounted on a scooter body, the bottom end of the rotatable shaft 51 is connected to, for example, an input shaft of a power transmitting mechanism (not shown) which is provided with a continuously variable transmission for an electric scooter. A rotational drive force produced by the motor is transmitted to the drive wheel of the electric scooter through the power transmitting mechanism, thereby enabling to run the electric scooter.

The stator 6 is secured to the casing 1 and comprises a core 61 which is formed by laminating silicon steel sheets of a permeable material which is stamped into a desired form and a coil (three-phase coil) 62 formed by having windings on the core 61.

The core 61 is formed into a substantially hollow cylinder which has an inner diameter slightly larger than the outer diameter of the rotor 5, a predetermined outer diameter and a predetermined length in a longitudinal direction.

Upper and lower outer peripherals of the core 61 are held between a first stepped portion 24 which is formed on the first casing member 2 and the top end of an outer cylinder 31 of the second casing member 3 as described afterward, and a clamping force to hold the core 61 is provided by bolts 4 for coupling the first and second casing members 2, 3. Thus, the stator 6 is securely fixed to the casing 1.

In this embodiment, the stator 6 is secured to the casing 1 while the first casing member 2 and the second casing member 3 are mutually connected and fixed, namely when the bolts 4 are being tightened. Thus, assembling workability is remarkable.

A current is flown through the coil 62 of the stator 6 via a lead 63 from outside to excite the core 61, thereby producing torque in the rotor 5. Specifically, the core 61 produces a rotating field which drives to rotate the rotor 5. The rotating field is generated by a motor drive controlling means (not shown) provided with an inverter which controls to switch the flow of current through the coil 62 (each coil of the three-phase coil) based on a detection signal by a rotor position sensor 10 to be described afterward.

And, a circuit board 9 for detecting the rotating position of the rotor 5 is secured to the top end of the inner cylinder 32 of the second casing member 3 with a screw 11. The rotor position sensor 10 is disposed on the circuit board 9 so to oppose the rotating periphery surface of the permanent magnet 53 of the rotor 5. The rotor position sensor 10 is a Hall element for example, and outputs a detection signal in synchronization with the permanent magnet of the rotor 5 which is passing by the opposed surface.

And, the circuit board 9 is fixed to the second casing member 3 with the screw 11 before the first casing member 2 and the second casing member 3 are mutually connected into one body. In this embodiment, since the outer cylinder 31 and the inner cylinder 32 of the second casing member 3 have substantially the same length in respective longitudinal directions as described afterward, a tapped hole for the screw 11 is formed easily in the inner cylinder 32, and the circuit board 9 can be mounted with the screw 11 with ease.

The casing 1 as the main member of the invention will be described.

The casing 1 which contains the above-described components of the motor comprises two members such as the first casing member 2 and the second casing member 3. No openings or through holes which are communicated with inside are formed on externally exposed sections of the first and second casing members 2, 3. The first and second casing members 2, 3 are mutually connected into the single casing 1 by tightening the bolts 4 at several points without requiring a sealing member. Thus, the casing 1 is provided with satisfactory dustproofness and waterproofness.

Specifically, the first casing member 2 comprises a cylindrical body section 21 which is formed into a substantially cylindrical shape with one end (the bottom end in FIG. 1) open and has predetermined inner and outer diameters and a top section 22 which closes the other end (the top end in FIG. 1) of the body section 21. And, the body section 21 and the top section 22 are formed into one body.

The bottom end of the first casing member 2 is open, and the outer periphery of the bottom end has a flange 23 in the form of a wide ring. The flange 23 serves as a mount for securing firmly the casing 1 in which the motor is housed to the scooter body.

Besides, a plurality of thin radiation fins 27 are formed to protrude from predetermined positions on the outer periphery surface of the body section 21 and the top surface of the top section 22. Operation heat generated from the motor operated is mainly conducted to the first casing member 2 and radiated in the air via the respective radiation fins 27. Therefore, the surface area can be increased by providing the plurality of radiation fins 27, and heat radiation can be improved accordingly. Thus, the motor and the casing 1 can be cooled efficiently. Especially, where the motor (casing 1) of the embodiment is used for an electric scooter, the outer surface of the first casing member 2 and the surfaces of the radiation fins 27 are exposed to and cooled by airflow while the scooter is running.

First, second and third inner diameter sections with an increased inner diameter are formed sequentially on the inner peripheral surface of the body section 21 of the first casing member 2 from the top to down in FIG. 1, the first stepped portion 24 in the form of a ring having a predetermined width is formed between the first inner diameter section and the second inner diameter section, and a second stepped portion 25 in the form of a ring having a predetermined width is formed between the second inner diameter section and the third inner diameter section.

In other words, the first inner diameter section has its inner diameter formed smaller by a predetermined size than the outer diameter of the core 61 of the stator 6 described above.

And, the second inner diameter section has its inner diameter formed to be equal to the outer diameter of the core 61 of the stator 6 and its length in a longitudinal direction formed longer by a predetermined size than the length in a longitudinal direction of the core 61.

Therefore, the core 61 can be held stably in the second inner diameter section, and the top outer periphery section of the core 61 can be engaged with the first stepped portion 24 which is formed between the first inner diameter section and the second inner diameter section.

Besides, the third inner diameter section has its inner diameter formed to be larger than the outer diameter of the core 61 and its length in the longitudinal direction formed to be slightly longer than the length of the second casing member 3 in the longitudinal direction.

In other words, the internal diameter size and length of the third inner diameter section are determined so that the second casing member 3 can be connected to the first, casing member 2 with the second casing member 3 inserted into the third inner diameter section.

And, a plurality of tapped holes 251 for bolts are formed to have a predetermined length and diameter along the longitudinal direction in predetermined positions of the second stepped portion 25 which is formed between the second inner diameter section and the third inner diameter section. In other words, these tapped holes for bolts are formed in positions corresponding to through holes for bolts which are formed in a flange 33 of the second casing member 3 to be described afterward.

Furthermore, the bearing support 26 which is formed into a cup shape having a predetermined diameter and depth at the center within the top section 22. The bearing 7 for the rotatable shaft 51 of the rotor 5 is forced into the bearing support 26 thereby securely fixing and holding. And, one end of the rotatable shaft 51 of the rotor 5 is rotatably supported on the first casing member 2 by means of the bearing 7.

The second casing member 3 is connected by the bolts 4 to the first casing member 2 which is configured as described above so as to be partly inserted therein.

The second casing member 3 comprises the outer cylinder 31 which is substantially cylindrical and has a predetermined diameter and length and one end opened, and the hollow inner cylinder 32 which is formed at the center of it. The flange 33 in the form of a wide ring is formed on a predetermined part of the outer periphery of the outer cylinder 31. The outer cylinder 31 has its outer diameter formed to be substantially equal to the inner diameter of the second inner diameter section of the first casing member 2.

The outer cylinder 31 may have at least a part of its outer diameter formed to be equal to the inner diameter of the second inner diameter section of the first casing member 2 so as to engage with it, and the remaining part may be formed into a different shape as required for the inner accommodating space as far as a space for forming a bolt connecting structure can be secured.

And, the flange 33 in the form of a thick ring having a predetermined width is integrally formed on a predetermined part of the outer cylinder 31.

Specifically, the flange 33 is formed in a position a predetermined distance away in the longitudinal direction from the opening of the outer cylinder 31 and to protrude externally along the entire periphery of the outer cylinder 31. This predetermined distance is properly determined according to a distance tightened by the bolts 4. And, the outer diameter of the flange 33 is determined to be slightly smaller than the inner diameter of the third inner diameter section of the first casing member 2 to secure a width allowing to dispose the bolt connecting structure. In other words, a plurality of through holes 331 for the bolts 4 are formed at predetermined intervals on the periphery of the flange 33. Besides, the flange 33 has a thickness larger than that of the second casing member 3 so that it is not deformed by a force to tighten the bolts 4, and the tightening force can be transmitted securely to the second casing member 3.

In addition, the first and second casing members 2, 3 are mutually connected by the bolts 4 and the core 61 of the stator 6 is held between the first and second casing members 2 and 3 and fixed to the casing 1, so that a special member for fixing the stator is not needed, the structure can be simplified, and assembling workability can be improved.

And, the inner cylinder 32 is formed into a hollow shape which has a predetermined diameter and a predetermined depth and also has its length in the longitudinal direction determined to be slightly shorter than the outer cylinder 31. And, the inner cylinder 32 has a wall thickness larger than that of the second casing member 3. Therefore, the ring-shaped bearing 8 can be forced into the inner cylinder 32 for securely fixing and holding. And, the other end of the rotatable shaft 51 of the rotor 5 is rotatably supported on the second casing member 3 by the bearing 8.

Furthermore, a through hole 34 having a given diameter is formed in an appropriate position of the second casing member 3, and a lead 63 for supplying power from outside to the motor is pierced through it.

The first casing member 2 and the second casing member 3 are formed of various kinds of metal materials, various kinds of hard resins, various kinds of ceramics or the like for example. And, the metal materials, which are good in heat transfer and high in strength, are preferably used if they do not disturb the rotating field for a motor.

The first casing member 2 and the second casing member 3 of this embodiment are made of aluminum or an aluminum alloy. The radiation fins 27 may be a separate member to be fixed to the first casing member 2, but are desirably formed to be integral with the first casing member in view of the cost of manufacturing.

And, the first casing member 2 and the second casing member 3 may be formed of the same material or different materials.

Besides, where materials having a different component and a different thermal expansion (thermal shrinkage) coefficient are used, the member positioned inside may be formed of a material having a high expansion coefficient if it is predicted to be used in a high-temperature environment or formed of a material having a low expansion coefficient if it is expected to be used in a low-temperature environment, so that cohesion between the members can be kept.

This casing 1 is mounted with its flange 23 onto the scooter body by, for example, screws or bolts. In this case, a sealing member (not shown) is placed between the flange 23 and the scooter body to exert waterproof and dustproof functions by the fluid-tightness of the sealing member. And, the sealing member may be a ring-shaped member formed of an elastic member such as rubber, the above-described liquid gasket, or another adhesive or the like which is hardened.

The casing of this embodiment for a motor comprises two members, but may also comprise three or more casing members. For example, the second casing member shown in FIG. 1 may be divided into two further casing members, and one of them supports the bearing 8 while the other is connected to the first casing member and holds to fix the stator 6 with the first casing member. In this case, most of the coupling portion of each casing member, especially the whole of it, is desirably positioned inside the first casing member 2.

As described above, in the casing of this embodiment, the coupling portions of the first casing member and the second casing member are positioned inside the first casing member and also deep into the first casing member, so that the coupling portions are not directly exposed to the outside surface of the casing but protected by the first casing member. Therefore, the coupling portions do not need any sealing materials for dustproof or waterproof, and working for disposing a sealing member and an installing process can be eliminated. As a result, the casing can be produced and assembled with ease.

Since the sealed points by the sealing material or the like are decreased in number, waterproofness and dustproofness of the casing as a whole can be improved, and reliability of the motor to be housed in it can be enhanced.

Since the bolt coupling portions are positioned inside the first casing member and also deep into the first casing member, the user cannot disassemble the first casing member and the second casing member by removing the bolts. Thus, the motor can be prevented from being modified illegally or repaired unskillfully, and its safety can be improved.

In addition, since the boundary (junction) at the coupling point between the first casing member and the second casing member and the bolt heads are not directly exposed out of the casing, possibility of damaging the pertinent portions can be prevented substantially, and appearance is remarkable.

In this embodiment, the second casing member is inserted into the first casing member. In the state that the casing is mounted on the scooter body (not shown), the first casing member covers the motor completely, and only the outside surface of the first casing member is exposed outside. Therefore, no heat insulating material such as a sealing material is on a heat conducting route, heat from the operation of the motor is conducted well, and many radiation fins can be disposed. Accordingly, a cooling efficiency for the motor can be improved.

Another aspect of the invention will be described.

In the casing 1 of this embodiment, the bolts 4 which secure the core 61 to the casing 1 by pushing it in the longitudinal direction are determined to have an appropriate length according to the length in the longitudinal direction of the core 61 which configures the motor, so that the required strength of the bolts 4 can be relieved. Conversely, the bolts can be selected according to the ratio of their length from those of the bolt strength classification specified by respective standards.

Specifically, according to differences in materials of a tightening member and a tightened member and length of respective members in the tightening direction, a thermal expansion (thermal shrinkage) due to a temperature change is different and a tightening force is variable. Therefore, the ratio of the length of respective members is appropriately determined to decrease the difference in thermal expansion (thermal shrinkage) and to suppress the change in tightening force. Thus, an initial tightening force needed is lowered to improve assimilability, and the strength required for the bolts as the tightening member is relieved, thereby reducing the cost and improving durability.

Specifically, the core 61 (iron material) which forms the motor is held between the two casing members (aluminum material), and these casing members are coupled by the bolts 4 (iron material) which supply a pressure to hold the core 61 between the two casing members. Therefore, since the members are formed of different materials, their thermal expansion coefficients are also different.

When the core and the bolts are formed of the same material but they have different lengths, the core and the bolts have different thermal expansions (thermal shrinkages). Besides, when the two casing members have different lengths, they have different thermal expansions (thermal shrinkages).

Therefore, when the bolts are tightened by an appropriate tightening force while assembling and a change in temperature takes place after assembling, an axial force acting on the respective members is variable because of different thermal expansions (thermal shrinkages) of the tightening member and the tightened member, and of a thermal stress resulting from such a difference.

The difference of the thermal expansion (thermal shrinkage) between the tightening member and the tightened member may also be represented by "a sum of a difference in thermal expansion (thermal shrinkage) between the core and the bolt and a difference in thermal expansion (thermal shrinkage) between the two casing members".

And, since the difference in length between the core and the bolt is equal to the difference in length between the two casing members, the difference in thermal expansion (thermal shrinkage) between the two casing members can be represented by the length of the core and the bolt.

Therefore, the difference in thermal expansion (thermal shrinkage) between the tightening member and the tightened member can be represented by only the thermal expansion coefficient of each member, the length of the core and the bolt, and a temperature variation as represented by an equation (4) to be described afterward.

And, as apparent from the equation (4), the larger a difference in thermal expansion coefficient between the members, the larger a difference in length between the core and the bolt, or the larger a temperature variation, the greater a difference in thermal expansion (thermal shrinkage) becomes.

Therefore, a difference in length between the core and the bolt is taken into account in this embodiment, and it is decreased, namely the ratio of length between the core and the bolt is determined to be close to 1, thereby enabling to suppress the difference in thermal expansion (thermal shrinkage) to be small even if the difference in thermal expansion coefficient between the members is large or the temperature variation is large.

And, the strength classification of bolts required can be determined according to the ratio of length between the core and the bolt.

The proportional relation of the length between the core and the bolt described above will be described with reference to FIG. 3.

Figure 3:
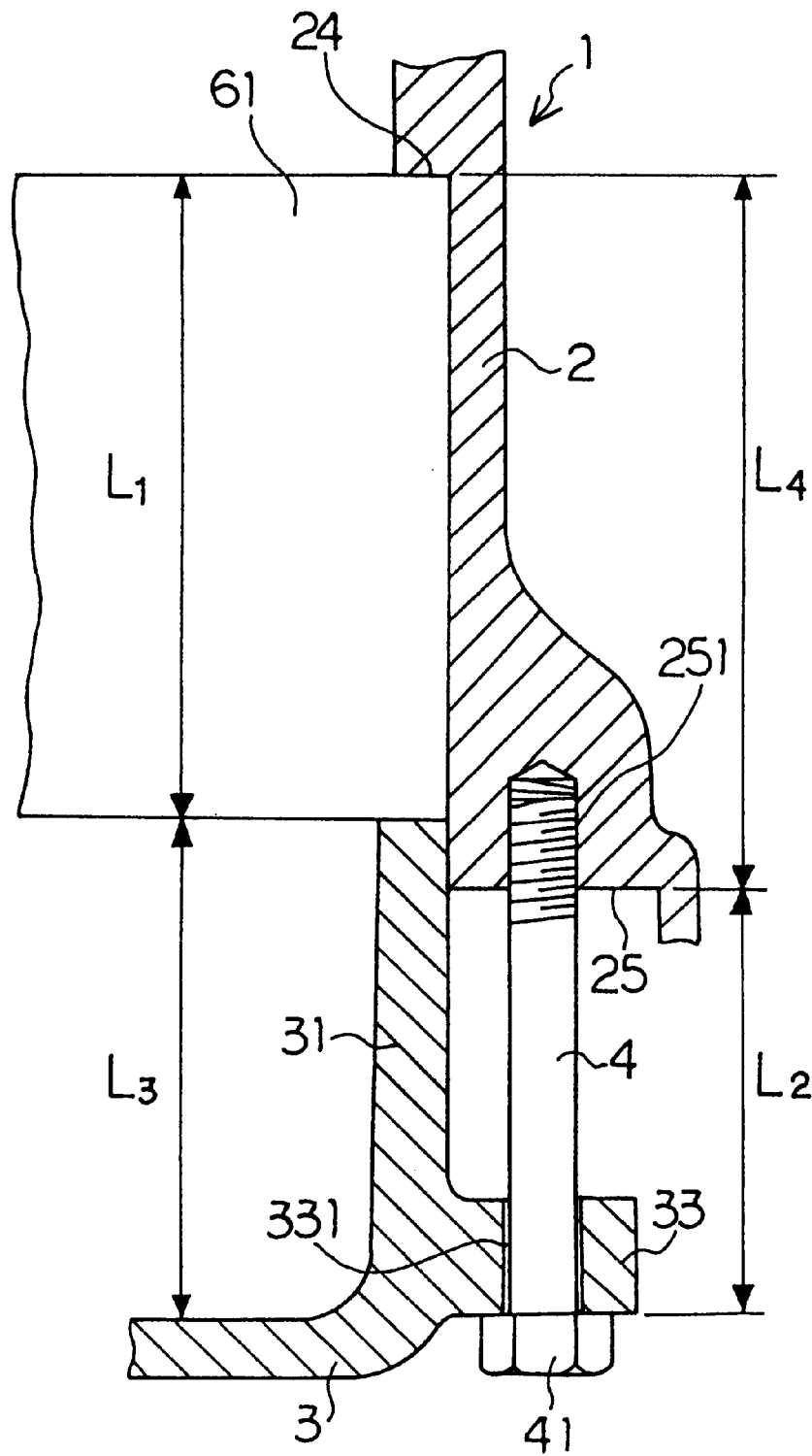
FIG. 3 is an enlarged sectional view showing the neighborhood of the joined portion of the motor casing.

As shown in FIG. 3, when it is assumed that the length (length of the portion to be held) of the core 61 in the longitudinal direction of the rotatable shaft 51 is L1 and the length (length of the portion excluding a head 41 and the portion engaged with an internal thread 251 from the overall length of the bolt 4) between the engaging portion of the bolt 4 to the first casing member 2 and the engaging portion of the bolt 4 to the second casing member 3 is L2, the proportional relation between L1 and L2 is determined to meet the conditions of the following equation (1) on the basis of the strength classification (according to Japanese Industrial Standards (JIS)) of the required joining member.

And, this proportional relation is desired to meet the conditions of the following equation (2), and more preferably to meet the conditions of the following equation (3).

$$0.55 \leq L1/L2 \leq 1.5 \quad (1)$$

$$0.76 \leq L1/L2 \leq 1.2 \quad (2)$$

$$0.96 \leq L1/L2 \leq 1.02 \quad (3)$$

Specifically, when it is assumed that a difference $|\Delta(L2+L4) - \Delta(L1+L3)|$ between a thermal expansion $\Delta(L2+L4)$ of the tightening member and a thermal expansion $\Delta(L1+L3)$ of the tightened member is $\Delta\lambda$, this $\Delta\lambda$ is expressed by the following equation (4).

$$\Delta\lambda = (\alpha_{Al} - \alpha_{St})|L2 - L1|\Delta t \quad (4)$$

A forming process of the equation (4) will be described.

Specifically, the length of the tightening members (the bolt 4 and the first casing member 2) is expressed as L2+L4, and the length of the tightened members (the core 61 and the second casing member 3) is expressed as L1+L3.

The thermal expansion of a certain member is generally expressed by the following equation.

Thermal expansion=(Thermal expansion coefficient)×(Length)×(Temperature difference)

Therefore, the thermal expansions of the tightening members and the tightened members are represented by the following equations, respectively.

Thermal expansion of the tightening member=$\Delta(L2+L4)$=$\alpha_{St}L2\Delta t + \alpha_{Al}L4\Delta t$ Thermal expansion of the tightened member=$\Delta(L1+L3)$=$\alpha_{St}L1\Delta t + \alpha_{Al}L3\Delta t$ The symbols used in the above equations represent:

$\alpha_{Al}$: Thermal expansion coefficient of aluminum $\alpha_{St}$: Thermal expansion coefficient of steel $\Delta t$: Temperature difference Therefore, a difference $\Delta\lambda$ between the thermal expansion of the tightening member and the thermal expansion of the tightened member is expressed as follows.

$$\Delta\lambda = |\Delta(L2 + L4) - \Delta(L1 + L3)|$$
$$= |(\alpha_{St}L2 \Delta t + \alpha_{Al}L4\Delta t) - (\alpha_{St}L1\Delta t + \alpha_{Al}L3\Delta t)|$$
$$= |\alpha_{St}(L2 - L1)\Delta t + \alpha_{Al}(L4 - L3)\Delta t|$$

And, the following relationship is established as apparent from FIG. 3.

L2+L4=L1+L3

Therefore, when L2+L4=L1+L3=L,

L3=L−L1, and

L4=L−L2, thus, L3 is expressed by L1 through L, and L4 is expressed by L2 through L.

The above-described $\Delta\lambda$ is expressed as follows.

$$\Delta\lambda = |\alpha_{St}(L2 - L1)\Delta t + \alpha_{Al}(L1 - L2)\Delta t| \quad (4)$$
$$= (\alpha_{Al} - \alpha_{St})|L2 - L1|\Delta t$$

And, L is also canceled, and L1 and L2 only are used to express, and the equation (4) is obtained.

And, it is apparent from the equation (4) that $\Delta\lambda$ can be obtained from information on length L1 and L2.

Besides, a ratio of $\Delta\lambda/\lambda$ of the difference $\Delta\lambda$ of the thermal expansion to the thermal expansion $\lambda(=\Delta L2)$ of the bolt 4 is expressed by the following equation (5).

$$\Delta\lambda/\lambda = (\alpha_{Al}/\alpha_{St} - 1)|1 - L1/L2| \quad (5)$$

A process of forming the equation (5) will be described.

The thermal expansion $\lambda$ of the bolt 4 is expressed by the following equation.

$$\lambda = \Delta L2$$

$$= \alpha_{St} L2 \Delta t$$

Then, the equation (5) is obtained in view of the ratio of $\Delta\lambda$ with respect to $\lambda$.

$$\frac{\Delta\lambda}{\lambda} = \frac{(\alpha_{Al} - \alpha_{St})|L2 - L1|\Delta t}{(\alpha_{St} L2 \Delta t)} \quad (5)$$

$$= (\alpha_{Al}/\alpha_{St} - 1)|1 - L1/L2|$$

Therefore, it is seen from the equation (5) that when L1/L2=1, $\Delta\lambda/\lambda$ becomes minimum and 0%. And, it is also seen that $\Delta\lambda/\lambda$ increases as L1/L2 becomes apart from 1.

And, the equation (5) can also be expressed by the following equation.

$$\Delta\lambda/\lambda = |(\alpha_{St} L2 \Delta t + \alpha_{Al} L4 \Delta t) - (\alpha_{St} L1 \Delta t + \alpha_{Al} L3 \Delta t)|/(\alpha_{St} L2 \Delta t)$$

$$= |1 - (\alpha_{St} L1 \Delta t + \alpha_{Al} L3 \Delta t - \alpha_{Al} L4 \Delta t)/(\alpha_{St} L2 \Delta t)|$$

The above equation has the following meaning.

Where the thermal expansion of the peripheral members to restrict the bolts, namely (thermal expansion of the tightened member)–(thermal expansion of the tightening member), is zero (as a special example, all the thermal expansion of the peripheral members restricting the bolts 4 is zero), $\Delta\lambda/\lambda$ becomes 100%.

Meanwhile, where the thermal expansion of the peripheral members to restrict the bolts, namely (thermal expansion of the tightened member)–(thermal expansion of the tightening member), is equal to the thermal expansion of the bolts 4 (an example of L1=L2), $\Delta\lambda/\lambda$ becomes 0%.

And, as described afterward, the change in axial force acting on the bolts 4 is proportional to $\Delta\lambda$.

As a result, it is seen that $\Delta\lambda/\lambda$ is a value indicating a changed level of the axial force given to the bolts 4 by the thermal expansion.

Besides, maximum value Fmax of the axial force acting on the bolts 4 is expressed by the following equation (6).

$$F_{max} = F + Z(\alpha_{Al} - \alpha_{St})|L2 - L1|\Delta T \quad (6)$$

The symbols used in the above equation (6) represent:

F: Initial tightening axial force
Z: Proportional constant
$\Delta T$: Temperature difference The above equations (4) to (6) will be described additionally.

Thermal expansion coefficients $\alpha_{Al}$, $\alpha_{St}$ are expressed as follows.

$$\alpha_{Al} = 24 \times 10^{-6} [1/°C.]$$

$$\alpha_{St} = 12.2 \times 10^{-6} [1/°C.]$$

And, a thermal stress resulting from the temperature difference $\Delta t$ is required to consider two cases where the temperature lowers and that the temperature rises.

Therefore, this embodiment will be described determining a case that the temperature becomes lower than when the casing is assembled (from 40° C. to −10° C.) as $\Delta t1$ and a case that the temperature becomes higher than when the casing is assembled (from 20° C. to 100° C.) as $\Delta t2$.

And, $\Delta t1$ and $\Delta t2$ are expressed as follows.

$\Delta t1 = 50°$ C.,
$\Delta t2 = 80°$ C.

The temperature difference $\Delta T$ is a value obtained from the temperature difference $\Delta t1$ or $\Delta t2$ by converting according to the following equation (7) or (8).

* Where L1>L2:

$$\Delta T = \Delta t2 \times 1.3^2 + \Delta t1 = 185.2 \quad (7)$$

* Where L1≦L2:

$$\Delta T = \Delta t1 \times 1.3^2 + \Delta t2 = 164.5 \quad (8)$$

The initial tightening axial force F was calculated from the torque produced by the motor and the condition that the stator 6 held between the casing members 2 and 3 did not rotate, and F was determined to be 285.1 kgf.

And, Z is a proportional constant indicating a change of the axial force of the bolt 4 due to displacement in the axial direction and expressed by the following equation (9).

$$\frac{Z}{d} = \frac{E_{Al}\frac{2.122}{\beta}(0.321\beta + 0.01\beta^2)}{1 + 2.702\frac{E_{Al}}{E_{St}}(0.321\beta + 0.01\beta^2)\left(1.252 + \frac{1}{\beta}\right)} \quad (9)$$

where, $$\beta = \frac{L_f}{d}$$

$L_f$: Tightening length=$L_z$
d: Nominal screw diameter=5 mm
$E_{Al}$: Vertical elasticity coefficient of aluminum=205.8 GPa
$E_{St}$: Vertical elasticity coefficient of steel=67.6 GPa
① Where L1>L2:

Where the casing and motor are assembled at an ambient temperature of 40° C. and the motor is operated at −10° C. ($\Delta t1 = 50°$ C.), the tightening members (the bolt 4 and the casing 2) tend to contract heavier than the tightened members (the core 61 and the casing 3), and the axial force acting on the bolt increases.

Increase (F$^+$) of the varied axial force is obtained by the following equation.

$$F^+ = Z\Delta\mu$$

$$= Z(\alpha_{Al} - \alpha_{St})|L2 - L1|\Delta t1$$

Conversely, where the motor is assembled at an ambient temperature of 20° C. and operated at 100° C. ($\Delta t2 = 80°$ C.), the tightening members (the bolt 4 and the casing 2) tend to expand more than the tightened members (the core 61 and the casing 3), and the axial force acting on the bolt decreases.

Decrease (F$^-$) of the varied axial force is obtained by the following equation.

$$F^- = Z(\alpha_{Al} - \alpha_{St})|L2 - L1|\Delta t2$$

And, when the motor produces torque T, a required axial force F0 is expressed by the following equation because the stator does not rotate.

$F0 = fT/\mu r$ (where, f: a safety ratio, $\mu$: a friction coefficient, r: a radius)

Therefore, even when the axial force lowers to minimum, an axial force F1 required for securing the above axial force is expressed by the following equation.

$$F1 = F0 + F^-$$

Where the bolts are tightened according to a torque method, a variation in the axial force due to friction on the screw surface is ±30%, so that a required initial tightening axial force F2 is obtained by the following equation.

$$F2 = (F0 + F^-) \times 1.3$$

To obtain the initial tightening axial force F2, when the bolts are tightened according to the torque method (a variation in the axial force due to friction on the thread surface is ±30%) and the temperature lowers, the axial force increases, and the maximum value of the axial force acting on the bolts is expressed as follows.

$$\begin{aligned}F\max &= F2 \times 1.3 + F^+ \\ &= (F0 + F^-) \times 1.3^2 + F^+ \\ &= F0 \times 1.3^2 + F^- \times 1.3^2 + F^+\end{aligned}$$

When it is assumed that $F0 \times 1.3^2 = F$, the above Fmax is expressed as follows.

$$\begin{aligned}F\max &= F + Z(\alpha_{Al} - \alpha_{St})|L2 - L1|\Delta t2 \times \\ &\quad 1.3^2 + Z(\alpha_{Al} - \alpha_{St})|L2 - L1|\Delta t1 \\ &= F + Z(\alpha_{Al} - \alpha_{St})|L2 - L1|(\Delta t2 \times 1.3^2 + \Delta t1) \\ &= F + Z(\alpha_{Al} - \alpha_{St})|L2 - L1|\Delta T\end{aligned} \quad (6)$$

Provided that, $$\Delta T = \Delta t2 \times 1.3^2 + \Delta t1 = 185.2 \quad (7)$$

② Where L1 ≦ L2:

Where the motor is assembled at an ambient temperature of 40° C. and operated at −10° C. (Δt1=50° C.), the tightened members (the core 61 and the casing 3) tend to contract more than the tightening members (the bolt 4 and the casing 2), and the axial force acting on the bolt decreases.

A decrease ($F^-$) of the changed axial force is obtained by the following equation.

$$F^- = Z(\alpha_{Al} - \alpha_{St})|L2 - L1|\Delta t1$$

Conversely, where the motor is assembled at an ambient temperature of 20° C. and operated at 100° C. (Δt2=80° C.), the tightened members (the core 61 and the casing 3) tend to expand more than the tightening members (the bolt 4 and the casing 2), and the axial force acting on the bolt increases.

An increase ($F^+$) of the varied axial force is obtained by the following equation.

$$F^+ = Z(\alpha_{Al} - \alpha_{St})|L2 - L1|\Delta t2$$

While the motor produces torque T, a required axial force F0 is expressed by the following equation because the stator does not rotate.

$F0 = fT/\mu r$ (where, f: a safety ratio, $\mu$: a friction coefficient, r: a radius)

Therefore, even when the axial force lowers to minimum, an axial force F1 required for securing the above axial force is expressed by the following equation.

$$F1 = F0 + F^-$$

Where the bolts are tightened according to a torque method, a variation in the axial force due to friction on the thread surface is ±30%, so that a required initial tightening axial force F2 is obtained by the following equation.

$$F2 = (F0 + F^-) \times 1.3$$

To obtain the initial tightening axial force F2, when the bolts are tightened according to the torque method (a variation in the axial force due to friction on the thread surface is ±30%) and the temperature rises, the axial force increases, and the maximum value of the axial force acting on the bolts is expressed as follows.

$$\begin{aligned}F\max &= F2 \times 1.3 + F^+ \\ &= (F0 + F^-) \times 1.3^2 + F^+ \\ &= F0 \times 1.3^2 + F^- \times 1.3^2 + F^+\end{aligned}$$

When it is assumed that $F0 \times 1.3^2 = F$, the above Fmax is expressed as follows.

$$\begin{aligned}F\max &= F + Z(\alpha_{Al} - \alpha_{St})|L2 - L1|\Delta t1 \times \\ &\quad 1.3^2 + Z(\alpha_{Al} - \alpha_{St})|L2 - L1|\Delta t2 \\ &= F + Z(\alpha_{Al} - \alpha_{St})|L2 - L1|(\Delta t1 \times 1.3^2 + \Delta t2) \\ &= F + Z(\alpha_{Al} - \alpha_{St})|L2 - L1|\Delta T\end{aligned} \quad (6)$$

where, $$\Delta T = \Delta t1 \times 1.3^2 + \Delta t2 = 164.5 \quad (8)$$

As a result, for both cases ① and ②, the maximum value Fmax of the axial force acting on the bolt 4 is expressed by the equation (6).

And, the maximum axial stress is expressed by the following equation.

Maximum axial stress=Maximum axial force/Effective cross-sectional area

The maximum axial stress is required to be smaller than the allowable stress of the bolt. In other words, the bolts are required to have an allowable stress larger than the maximum axial stress.

It is predicted from the above results that when a ratio of L1/L2 is close to 1, the change in the bolt axial force with respect to a raised or lowered temperature change can be lessened, and the strength conditions required for the bolts can be relieved.

Besides, by utilizing the above results, a length ratio of L1/L2 according to the strength classification of the practically used bolt standard is determined.

Specifically, Table 1 below shows the relationship between the strength classification and the yield point and allowable stress specified in JIS B 1051 (Mechanical Properties of Steel Bolts and Screws). JIS B 1051 is based on the ISO 898-1.

TABLE 1

| Strength class | Yield point | Allowable stress |
|---|---|---|
| 8.8 | 65.3 [kgf/mm$^2$](640 [N/mm$^2$]) | 34.6 [kgf/mm$^2$](339.2 [N/mm$^2$]) |
| 6.8 | 48.9 [kgf/mm$^2$](480 [N/mm$^2$]) | 25.9 [kgf/mm$^2$](254.4 [N/mm$^2$]) |
| 4.8 | 34.7 [kgf/mm$^2$](340 [N/mm$^2$]) | 18.4 [kgf/mm$^2$](180.2 [N/mm$^2$]) |

In Table 1, the allowable stress was calculated by an equation "Allowable stress=0.53×yield point (proof stress)" in view of a ratio between nominal thread diameter and effective sectional area of the bolt and a shear stress applied to the thread (see Nikkei Mechanical, Nov. 1, 1993).

In view of the above-described contents, a required conditional equation is expressed as follows.

$$[F+Z(\alpha_{Al}-\alpha_{St})|L2-L1|\Delta T]/\text{Effective sectional area} \leq 0.53 \times \text{yield point (proof stress)}$$

Therefore, as to the bolts in the respective strength classification, L1 and L2 which meet the above conditional equation are derived.

Specifically, when L1 and L2 satisfy the above equation (1), a ratio of $\Delta\lambda/\lambda$ of the difference in thermal expansion between the tightening member and the tightened member with respect to the thermal expansion of the bolt 4 becomes 50% or below from the equation (5), and a variation in the axial force due to the thermal stress acting on the bolt 4 can be reduced. And, the maximum axial stress acting on the bolt 4 becomes 34.1 kgf/mm$^2$ from the equations (6) to (9). Therefore, the bolt belonging to the strength classification 8.8 of JIS B 1051 can be used.

And, when L1 and L2 satisfy the above equation (2), $\Delta\lambda/\lambda$ becomes 24% or below from the equation (5), and the maximum axial stress acting on the bolt 4 becomes 25.3 kgf/mm$^2$ from the equations (6) to (9). Therefore, the bolt belonging to the strength classification 6.8 of JIS B 1051 can be used.

Besides, when L1 and L2 satisfy the above equation (3), $\Delta\lambda/\lambda$ becomes 4% or below (3.9%) from the above equation (5), and the maximum axial stress acting on the bolt 4 becomes 18.1 kgf/mm$^2$ from the equations (6) to (9). Therefore, the blot belonging to the strength classification 4.8 of JIS B 1051 can be used.

Thus, with the casing 1 of this embodiment, the bolt 4 having a yield point of about 34 to 66 kgf/mm$^2$ can be used.

Therefore, the bolt having such a strength is free from undergoing hydrogen embrittlement and can have its surface plated and particularly plated for corrosion prevention to improve its corrosion resistance.

And, since the above bolt is inexpensive as compared with a high-strength (a yield point of 95.9 kgf/mm$^2$ or more) bolt, the cost for production can be reduced. Especially, since the motor casing of this embodiment has a relatively large number of bolts in view of a coupling strength and safety, an effect of highly reducing production costs can be expected. Besides, torque of tightening the bolts 4 can be lowered.

Another embodiment of the motor casing according to the invention will be described with reference to FIG. 4.

Figure 4:
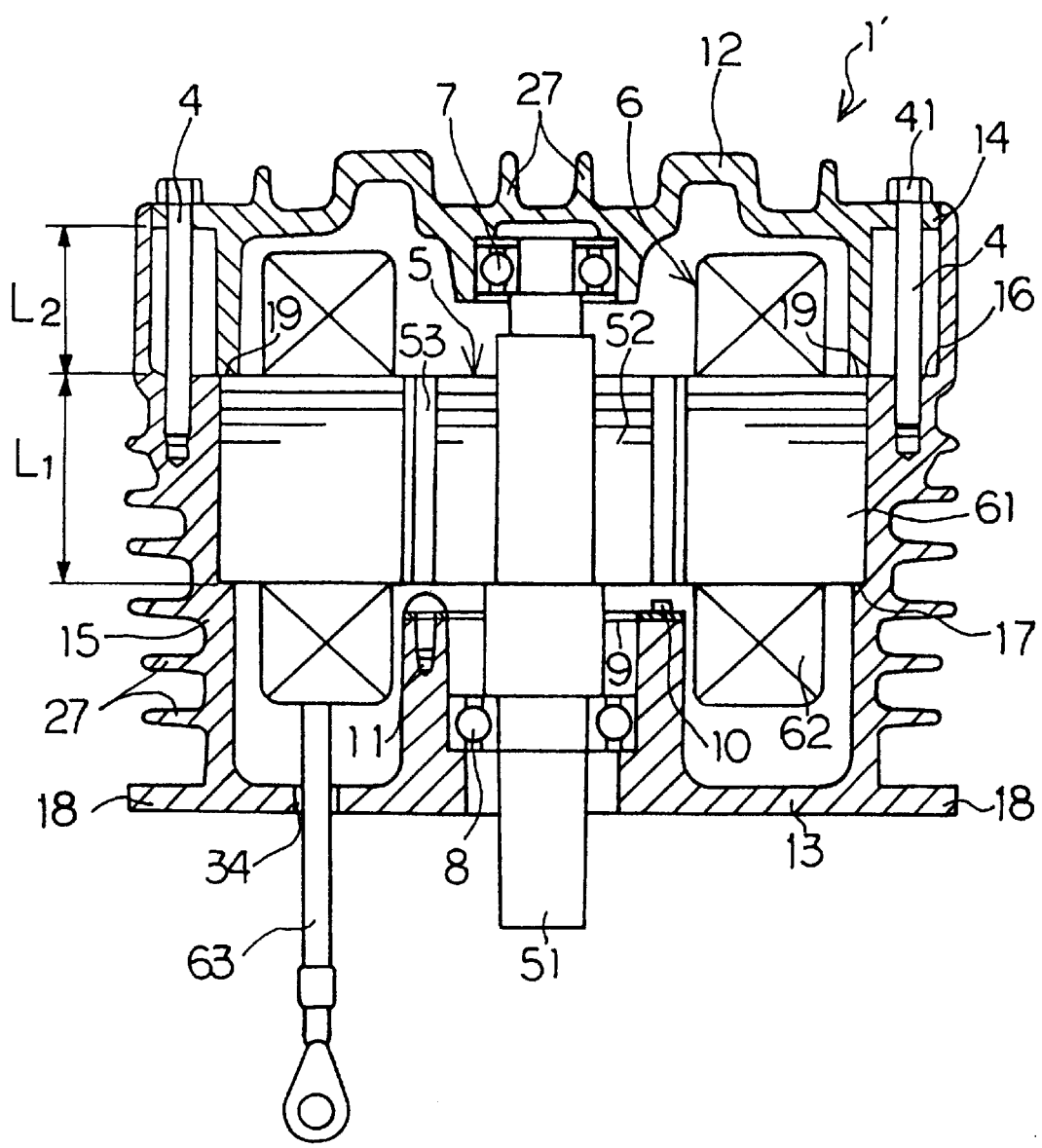
FIG. 4 is a sectional side elevation view showing another embodiment of applying the motor casing of the invention to a motor for an electric scooter.
Figure 5:
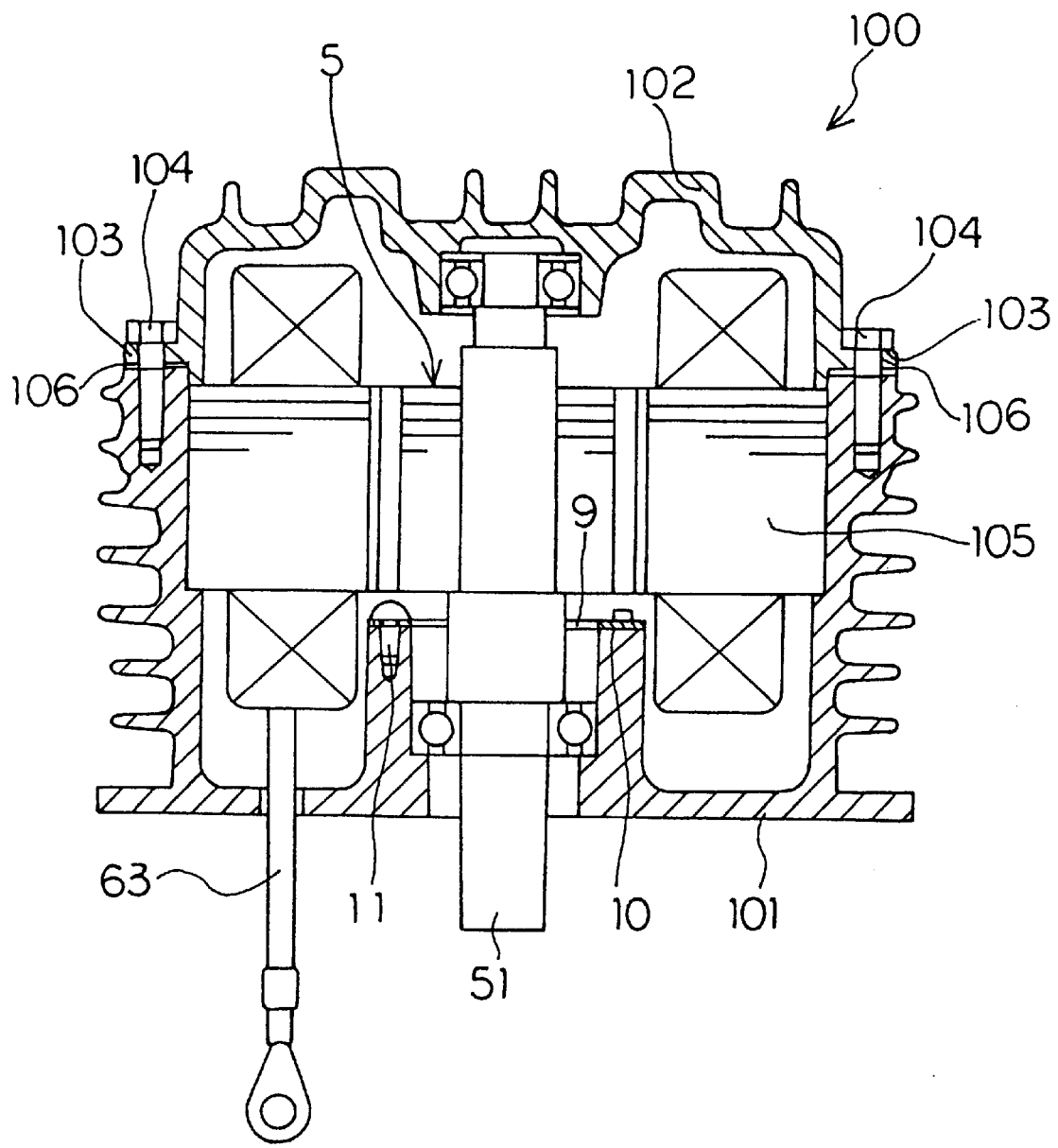
FIG. 5 is a sectional side elevation view showing the motor casing of a comparative example.

FIG. 4 is a sectional side elevation view showing another embodiment of applying the motor casing of this embodiment to a motor for an electric scooter. Description will be made of differences of a casing 1' for a motor shown in FIG. 4 from the casing 1 described above.

The casing 1' comprises a first casing member 12 and a second casing member 13, and a flange 14 is formed on the outer periphery at the top of the first casing member 12 shown in FIG. 4.

And, an outer cylinder 15 of the second casing member 13 is provided with a first stepped portion 16 having the inner diameter decreased from the upper part to the lower part in FIG. 4 and a second stepped portion 17 having the inner diameter further decreased in the same direction.

The coupling portions (connection portions) of the first casing member 12 and the second casing member 13 are formed by the flange 14 and the first stepped portion 16. Specifically, the flange 14 and the first stepped portion 16 are tightened by bolts 4 to connect the first casing member 12 and the second casing member 13 into one body.

A flange 18 is formed as a mount for securing the motor to the scooter body on the outer periphery at the bottom end of the second casing member 13.

By tightening the respective bolts 4, the outer periphery of the core 61 is held between a bottom end 19 of the first casing member 12 and the second stepped portion 17 formed on the second casing member 13. Thus, the stator 6 is secured to the casing 1'.

As to the casing 1', in the same way as the previous embodiment, the length L1 of the held portion of the core 61 in the direction of the rotational shaft 51 and the length (length of the portion excluding the head 41 and the portion inserted into the first stepped portion 16 from the overall length of the bolt 4) L2 between the engaging portion of the bolt 4 to the first casing member 2 and the engaging portion of the bolt 4 to the second casing member 3 are determined to conform to the above-described equations (1) to (3).

Thus, the casing 1' of this embodiment has the same actions and effects as the previous embodiment.

The casings for a motor of the invention were described with reference to the embodiments shown in the drawings, but it is to be understood that the invention is not limited to such embodiments.

In other words, the casing for a motor of this embodiment comprises two casing members, but it is not limited thereto and can be formed of three or more casing members. For example, the second casing member shown in FIG. 1 can be divided into two casing members, and one of them supports the bearing 8 while the other is connected to the first casing member and holds to fix the stator 6 with the first casing member. In this case, most of the coupling portion of each casing member, especially the whole of it, is desirably positioned inside the first casing member 2.

And, the bolt 4 is not limited to be made of steel and may be made of stainless steel, titanium or titanium alloy for example.

Besides, the coupling members are preferably bolts and other screw members but not limited to them.

In addition, the casing for a motor according to the invention is not limited to be used for the electric scooter and electric vehicle described above, but may be adopted for any applications.

INDUSTRIAL APPLICABILITY

The invention is suitable for a motor casing of a motor to be used as a drive source of a device provided with an electric motor, for example, an electric scooter, an electric vehicle or the like.

We claim:

1. A method for producing a motor casing having a first casing member and a second casing member which are separated in a direction of a rotation shaft of a motor, the first and second casing members being coupled by coupling members, and a stator of the motor being held by the first casing member and the second casing member to be fixed within the casing, the method is characterized in that when it is assumed that a length of the stator is L1, and a length between engaging portions of each of the coupling members with the first and second casing members is L2, a required strength classification of the coupling members is determined in advance according to a predetermined equation including a ratio of L1 and L2.

2. A method for producing a motor casing according to claim 1, wherein the coupling members are bolts.

* * * * *